United States Patent
Hiruma et al.

(10) Patent No.: US 12,091,562 B2
(45) Date of Patent: Sep. 17, 2024

(54) COMPOSITION FOR AQUEOUS INK JET AND METHOD FOR PRODUCING RECORDED PRODUCT

(71) Applicant: Seiko Epson Corporation, Tokyo (JP)

(72) Inventors: Kei Hiruma, Chino (JP); Homare Kuribayashi, Ikeda (JP); Shotaro Watanabe, Suwa (JP); Koji Imamura, Shiojiri (JP); Masato Hanamura, Shiojiri (JP); Jungo Asano, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 1007 days.

(21) Appl. No.: 17/042,067

(22) PCT Filed: Feb. 6, 2019

(86) PCT No.: PCT/JP2019/004128
§ 371 (c)(1),
(2) Date: Sep. 25, 2020

(87) PCT Pub. No.: WO2019/187658
PCT Pub. Date: Oct. 3, 2019

(65) Prior Publication Data
US 2021/0095151 A1    Apr. 1, 2021

(30) Foreign Application Priority Data

Mar. 28, 2018    (JP) .................... 2018063360

(51) Int. Cl.
| | |
|---|---|
| *C09D 11/00* | (2014.01) |
| *C08K 3/08* | (2006.01) |
| *C08K 5/092* | (2006.01) |
| *C09D 11/328* | (2014.01) |
| *C09D 11/38* | (2014.01) |
| *D06P 5/00* | (2006.01) |
| *D06P 5/30* | (2006.01) |

(52) U.S. Cl.
CPC .............. *C09D 11/328* (2013.01); *C08K 3/08* (2013.01); *C08K 5/092* (2013.01); *C09D 11/38* (2013.01); *D06P 5/002* (2013.01); *D06P 5/30* (2013.01); *C08K 2003/0818* (2013.01)

(58) Field of Classification Search
CPC ........ C09D 11/328; C09D 11/38; C08K 3/08; C08K 5/092; C08K 2003/0818; D06P 5/002; D06P 5/30
USPC .............................. 106/31.01, 31.13, 31.27
See application file for complete search history.

(56) References Cited

U.S. PATENT DOCUMENTS

| | | | |
|---|---|---|---|
| 4,677,445 | A | 6/1987 | Haruta |
| 5,512,061 | A | 4/1996 | von der Eltz et al. |
| 2002/0081421 | A1 | 6/2002 | Bagwell et al. |
| 2015/0239261 | A1 | 8/2015 | Sugiyama et al. |

FOREIGN PATENT DOCUMENTS

| | | | | |
|---|---|---|---|---|
| JP | H01-182383 A | | 7/1989 | |
| JP | H05-005073 A | | 1/1993 | |
| JP | H06-299476 A | | 10/1994 | |
| JP | 2003171591 A | * | 6/2003 | |
| JP | 2004-528195 A | | 9/2004 | |
| JP | 2005001217 A | * | 1/2005 | ............. C09D 11/40 |
| JP | 2013-159647 A | | 8/2013 | |
| JP | 2014-173036 A | | 9/2014 | |
| JP | 2015048553 A | * | 3/2015 | |
| JP | 2015-147848 A | | 8/2015 | |
| JP | 2015-161043 A | | 9/2015 | |
| JP | 2017-036364 A | | 2/2017 | |

OTHER PUBLICATIONS

1 International Search Report (English and Japanese) issued in PCT/JP2019/004128; mailed Apr. 9, 2019; ISA/JP.

* cited by examiner

*Primary Examiner* — James E McDonough
(74) *Attorney, Agent, or Firm* — Harness, Dickey & Pierce, P.L.C.

(57) ABSTRACT

A composition for aqueous ink contains water and a coloring material, wherein the calcium ion content x (ppm) and the oxalate ion content y (ppm) in the composition for aqueous ink jet satisfy the relation of $y \leq 3491.8 x^{-3.386}$.

7 Claims, No Drawings

COMPOSITION FOR AQUEOUS INK JET AND METHOD FOR PRODUCING RECORDED PRODUCT

CROSS REFERENCE TO RELATED APPLICATIONS

This application is a U.S. National Phase application of International Application No. PCT/JP2019/004128, filed on Feb. 6, 2019 which claims priority to Japanese Patent Application No. 2018-063360, filed on Mar. 28, 2018. The entire disclosures of the above applications are expressly incorporated by reference herein.

BACKGROUND

Technical Field

The present invention relates to a composition for aqueous ink jet and a method for producing a recorded product.

Related Art

Ink jet printing has excellent on-demand properties and has the characteristics of being capable of preferable recording even by using a relatively small recording apparatus (printer) and being capable of high-speed recording, etc. and is thus applied to office/home printing machines and also applied to commercial printing, textile printing, and the like.

In particular, widely used is a composition for aqueous ink jet containing water, which is advantageous for suppressing adverse effects on environment and health when a solvent is removed (refer to Japanese Unexamined Patent Application Publication No. 2017-36364).

A composition to be ejected by an ink jet method is required to have excellent ejection stability and to be capable of maintaining excellent ejection stability even when stored for a long time or the like (that is, be excellent in storage stability). When droplets cannot be stably ejected, it becomes difficult to form a desired pattern (image).

However, even when a composition for aqueous ink jet has excellent ejection stability immediately after production, in general, ejection of droplets by an ink jet method becomes difficult due to solid precipitation over time.

SUMMARY

The present invention has been achieved for solving the problem and can be realized as the following application examples.

[1] A composition for aqueous ink containing water and a coloring material, wherein the calcium ion content x (ppm) and the oxalate ion content y (ppm) in the composition for aqueous ink jet satisfy the relation of formula (1) below.

$$y \leq 3491.8 x^{-3.386} \quad (1)$$

[2] The composition for aqueous ink jet described above in [1], wherein the calcium ion content x is 1.0 ppm or more and 8.0 ppm or less.

[3] The composition for aqueous ink jet described above in [1] or [2], wherein the oxalate ion content y is 1.0 ppm or more and 30 ppm or less.

[4] The composition for aqueous ink jet described above in any one of [1] to [3], wherein the coloring material is at least one selected from the group consisting of C.I. Acid Orange 33, C.I. Acid Blue 87, and C.I. Acid Black 52:1.

[5] A method for producing a recorded product including an ejection step of ejecting the composition for aqueous ink jet described above in any one of [1] to [4] to a recording medium composed of a fiber-containing material by an ink jet method, and a precipitation step of precipitating calcium oxalate in the recording medium.

[6] The method for producing a recorded product described above in [5], wherein the recording medium is a fabric.

[7] The method for producing a recorded product described above in [5] or [6], further including a precipitation accelerator adding step of adding, to the recording medium, a precipitation accelerator containing oxalate ions or calcium ions at a higher content than that in the composition for aqueous ink jet.

DETAILED DESCRIPTION

Preferred embodiments of the present invention are described in detail below.

Composition for Aqueous in Jet

First, a composition for aqueous ink jet of the present invention is described.

The composition for aqueous ink jet is a composition for aqueous in jet containing water and a coloring material, wherein the calcium ion content x (ppm) and the oxalate ion content y (ppm) in the composition for aqueous ink jet satisfy the relation of formula (1) below.

$$y \leq 3491.8 x^{-3.386} \quad (1)$$

Thus, when the composition for aqueous ink jet is stored as it is, unintended solid precipitation can be effectively prevented, and the composition for aqueous ink jet can be stably ejected by an ink jet method over a long time. In particular, when there is a large temperature change (for example, when a temperature change range is 40° C. or more) of a composition for aqueous ink jet or when a composition for aqueous ink jet is placed in a low-temperature environment (for example, in an environment of −5° C. or less), in general, the problem of solid precipitation particularly remarkably occurs. However, even with a large temperature change of the composition for aqueous ink jet of the present invention, the composition for aqueous ink jet can be effectively prevented from causing unintended solid precipitation. Also, solid precipitation or the like in an ink jet head or the like can be effectively prevented, and thus maintenance of a recording apparatus (printer) using an ink jet method is facilitated, thereby enabling an attempt to increase the life of the recording apparatus. In addition, the flashing distance can be lengthened, thereby causing an advantage for improving the productivity of a recorded product.

While when the configuration described above is not satisfied, satisfactory results cannot be obtained.

For example, with the condition of formula (1) being not satisfied, unintended solid precipitation easily occurs when the composition for aqueous ink jet is stored as it is. More specifically, even in the case where only one of the calcium ion content and the oxalate ion content in the composition for aqueous in jet is low, with the condition of formula (1) being not satisfied, unintended solid precipitation easily occurs when the composition for aqueous ink jet is stored as it is.

The calcium ion content and the oxalate ion content in the composition for aqueous ink jet can be determined by an ion chromatography method.

In addition, oxalate ions can form salts having low solubility in water with other cations (for example, cadmium ions, silver ions, zinc ions, cobalt ions, copper ions, lead ions, nickel ions, or the like). However, for the reason that these cations generally form, with oxalate ions, salts (oxalate salts) having higher solubility in water than calcium oxalate and have the low possibility of being mixed at a high content in the composition for aqueous ink jet as compared with calcium ions, consideration may not be given to the problem caused by precipitation as a solid in the composition for aqueous ink jet. Therefore, the present invention specifies the relation between the calcium ion content and the oxalate ion content in the composition for aqueous ink jet.

As described above, in the present invention, the calcium ion content x (ppm) and the oxalate ion content y (ppm) in the composition for aqueous ink jet may satisfy the relation of the formula (1).

In the composition for aqueous ink jet, the calcium ion content x is preferably 1.0 ppm or more and 8.0 ppm or less, more preferably 1.5 ppm or more and 7.5 ppm or less, and still more preferably 2.0 ppm or more and 7.0 ppm or less.

Therefore, when the composition for aqueous ink jet is stored as it is or the like, unintended solid precipitation can be more effectively prevented, and calcium oxalate can be more preferably precipitated in a precipitation step described in detail later.

In the composition for aqueous ink jet, the oxalate ion content y is preferably 1.0 ppm or more and 30 ppm or less, more preferably 2.0 ppm or more and 27 ppm or less, and still more preferably 3.0 ppm or more and 25 ppm or less.

Therefore, when the composition for aqueous ink jet is stored as it is or the like, unintended solid precipitation can be more effectively prevented, and calcium oxalate can be more preferably precipitated in a precipitation step described in detail later.

Coloring Material

Usable examples of the coloring material constituting the composition for aqueous ink jet include various water-soluble dyes, disperse dyes, oil dyes, pigments, and the like.

Examples of the water-soluble dyes include acid dyes such as C.I. Acid Yellow 1, 3, 6, 11, 17, 18, 19, 23, 25, 36, 38, 40, 40:1, 42, 44, 49, 59, 59:1, 61, 65, 67, 72, 73, 79, 99, 104, 159, 169, 176, 184, 193, 200, 204, 207, 215, 219, 219:1, 220, 230, 232, 235, 241, 242, and 246; C.I. Acid orange 3, 7, 8, 10, 19, 22, 24, 51, 51S, 56, 67, 74, 80, 86, 87, 88, 89, 94, 95, 107, 108, 116, 122, 127, 140, 142, 144, 149, 152, 156, 162, 166, and 168; C.I. Acid Red 1, 6, 8, 9, 13, 18, 27, 35, 37, 52, 54, 57, 60, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, and 415; C.I. Acid Violet 17, 19, 21, 42, 43, 47, 48, 49, 54, 66, 78, 90, 97, 102, 109, and 126; C.I. Acid Blue 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 258, 260, 264, 277:1, 278, 279, 280, 284, 290, 296, 298, 300, 317, 324, 333, 335, 338, 342, and 350; C.I. Acid Green 9, 12, 16, 19, 20, 25, 27, 28, 40, 43, 56, 73, 81, 84, 104, 108, and 109; C.I. Acid Brown 2, 4, 13, 14, 19, 28, 44, 123, 224, 226, 227, 248, 282, 283, 289, 294, 297, 298, 301, 355, 357, and 413; C.I. Acid Black 1, 2, 3, 24, 24:1, 26, 31, 50, 52, 52:1, 58, 60, 63, 63S, 107, 109, 112, 119, 132, 140, 155, 172, 187, 188, 194, 207, and 222, and the like; direct dyes such as C.I. Direct Yellow 8, 9, 10, 11, 12, 22, 27, 28, 39, 44, 50, 58, 86, 87, 98, 105, 106, 130, 137, 142, 147, and 153; C.I. Direct Orange 6, 26, 27, 34, 39, 40, 46, 102, 105, 107, and 118; C.I. Direct Red 2, 4, 9, 23, 24, 31, 54, 62, 69, 79, 80, 81, 83, 84, 89, 95, 212, 224, 225, 226, 227, 239, 242, 243, and 254; C.I. Direct Violet 9, 35, 51, 66, 94, and 95; C.I. Direct Blue 1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, and 291; C.I. Direct Green 26, 28, 59, 80, and 85; C.I. Direct Brown 44, 44:1, 106, 115, 195, 209, 210, 212:1, 222, and 223; C.I. Direct Black 17, 19, 22, 32, 51, 62, 108, 112, 113, 117, 118, 132, 146, 154, 159, and 169, and the like; reactive dyes such as C.I. Reactive Yellow 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, and 176; C.I. Reactive Orange 1, 4, 5, 7, 11, 12, 13, 15, 16, 20, 30, 35, 56, 64, 67, 69, 70, 72, 74, 82, 84, 86, 87, 91, 92, 93, 95, and 107; C.I. Reactive Red 2, 3, 3:1, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 226, 228, and 235; C.I. Reactive Violet 1, 2, 4, 5, 6, 22, 23, 33, 36, and 38; C.I. Reactive Blue 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, and 236; C.I. Reactive green 8, 12, 15, 19, and 21; C.I. Reactive Brown 2, 7, 9, 10, 11, 17, 18, 19, 21, 23, 31, 37, 43, and 46; C.I. Reactive Black 5, 8, 13, 14, 31, 34, and 39; and the like.

Examples of the disperse dyes include C.I. Disperse Yellow 5, 42, 54, 64, 79, 82, 83, 93, 99, 100, 119, 122, 124, 126, 160, 184:1, 186, 198, 199, 204, 224, and 237; C.I. Disperse Orange 13, 29, 31:1, 33, 49, 54, 55, 66, 73, 118, 119, and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; C.I. Disperse Green 6:1 and 9; and the like.

Examples of the oil dyes include C.I. Solvent•Black 3, 7, 27, 29, and 34; C.I. Solvent•Yellow14, 16, 19, 29, 56, and 82; C.I. Solvent•Red 1, 3, 8, 18, 24, 27, 43, 51, 72, 73, 132, and 218; C.I. Solvent•Violet 3; C.I. Solvent•Blue 2, 11, and 70; C.I. Solvent•Green 3 and 7; C.I. Solvent•Orange 2; and the like.

For example, various organic and inorganic pigments can be used as the pigment. Examples thereof include azo pigments such as azo lake, insoluble azo pigments, condensed azo pigments, chelate azo pigments, and the like; cyclic pigments such as phthalocyanine pigments, perylene and perylene pigments, anthraquinone pigments, quinacridone pigments, dioxanzine pigments, thioindigo pigments, isoindolinone pigments, quinophthaloni pigments, and the like; dye lakes such as basic dye lakes, acid dye lakes, and the like; organic pigments such as nitro pigments, nitroso pigments, aniline black, daylight fluorescent pigments, and the like; and inorganic pigments such as carbon black and the like.

In particular, the coloring material constituting the composition for aqueous ink jet is preferably a water-soluble dye and more preferably an acid dye.

Such dyes generally have relatively high contents of calcium ions and oxalate ions derived from the components used in the production process thereof or the like, and thus when applied to a composition for aqueous ink jet, the problem described above easily occurs. However, the present invention can effectively prevent the occurrence of the problem described above even when containing a water-soluble dye (particularly, an acid dye) as the coloring material. That is, when the composition for aqueous ink jet contains a water-soluble dye (particularly, an acid dye), the effect of the present invention is more remarkably exhibited.

In particular, the coloring agent constituting the composition for aqueous ink jet is preferably at least one selected from the group consisting of C.I. Acid Yellow 49, C.I. Acid Red 249, C.I. Acid Red 407, C.I. Acid Blue 87, C.I. Acid Blue 90:1, C.I. Acid Black 52:1, C.I. Acid Black 172, C.I. Acid Black 194, C.I. Acid Orange 95, and C.I. Acid Orange 33, and is more preferably at least one selected from the group consisting of C.I. Acid Orange 33, C.I. Acid Blue 87, and C.I. Acid Black 52:1.

The inventor found that when these dyes are dissolved in water, the influence of calcium ions and oxalate ions contained as trace components is easily seen due to the influence of hydration or the like, and when used as a constituent component of a composition for aqueous ink jet, the problem described above more remarkably occurs. Whereas, the present invention can effectively prevent the occurrence of the problem described above even when using the coloring material described above. That is, when the composition for aqueous ink jet contains the coloring material described above, the effect of the present invention is more remarkably exhibited.

The coloring material constituting the composition for aqueous ink jet of the present invention is preferably treated by purification.

Therefore, the calcium ion content x and the oxalate ion content y in the composition for aqueous ink jet can be easily and securely adjusted within a preferred range.

The purification treatment may be performed for the coloring material used for preparing the composition for aqueous ink jet or may be performed for a mixture prepared by mixing the coloring material with another constituent component of the composition for aqueous ink jet.

The purification treatment can be performed by, for example, a method of mixing a liquid composition containing the coloring material (for example, a solution prepared by dissolving the coloring material in an organic solvent) with an adsorbent (for example, activated carbon, zeolite, diatomite, or the like) or an ion exchange resin, stirring the mixture, and then filtering the mixture; a method of passing through a column filled with an adsorbent or an ion exchange resin; a method of desalting purification using an ultrafilter; or the like. These can be used in combination of one or two or more.

The content of the coloring material in the composition for aqueous ink jet is not particularly limited, but is preferably 5.0% by mass or more and 15% by mass or less, more preferably 6.0% by mass or more and 14% by mass or less, and still more preferably 7.0% by mass or more and 13% by mass or less.

Thus, when the coloring material is contained at such a relatively high content, a high color density can be obtained in a recorded portion formed by using the composition for aqueous ink jet, and on the other hand, the inventor found that the problem described above generally easily occurs. However, even with such a relatively high content of the coloring material, the present invention can effectively prevent the occurrence of the problem described above. That is, a high color density can be obtained in a recorded portion formed by using the composition for aqueous ink jet, and the occurrence of the problem described above can be effectively prevented, thereby more remarkably exhibiting the effect of the prevent invention.

Water

The composition for aqueous ink jet contains water.

The content of water in the composition for aqueous ink jet is not particularly limited, but is preferably 30% by mass or more and 85% by mass or less, more preferably 35% by mass or more and 80% by mass or less, and still more preferably 40% by mass or more and 75% by mass or less.

Thus, the viscosity of the composition for aqueous ink jet can be more securely adjusted to a preferred value, and ejection stability by an ink jet method can be more improved. In addition, even when the water contained in the composition for aqueous ink jet is partially vaporized, the unintended precipitation of calcium oxalate in the composition for aqueous ink jet can be more effectively prevented.

Solvent other than Water

The composition for aqueous ink jet may contain a solvent other than water.

Thus, for example, the viscosity of the composition for aqueous ink jet can be preferably adjusted, and moisture retention of the composition for aqueous ink jet can be enhanced. Consequently, droplets can be more stably ejected by an ink jet method.

The solvent other than water is in a simple liquid form (liquid) at room temperature (25° C.) and preferably has a boiling point (boiling point under 1 atm or less) of 180° C. or more and 320° C. or less, more preferably 185° C. or more and 310° C. or less, and still more preferably 190° C. or more and 300° C. or less.

Examples of the solvent other than water contained in the composition for aqueous ink jet include alkylene glycol and ethers and esters thereof (also generally referred to as "alkylene glycols" hereinafter); tri- or higher polyhydric alcohols; nitrogen-containing heterocyclic compounds; lactones such as γ-butyrolactone and the like; and the like.

More specific examples of the alkylene glycols include 1,2-butanediol, 1,2-pentanediol, 1,2-hexanediol, 1,2-heptanediol, 1,2-propanediol (propylene glycol), 1,3-propanediol, 1,3-butanediol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, triethylene glycol monomethyl ether, triethylene glycol monobutyl ether, diethylene glycol monomethyl ether, diethylene glycol monobutyl ether, diethylene glycol, dipropylene glycol, triethylene glycol, and the like.

The tri- or higher polyhydric alcohols is, for example, glycerin.

Examples of the nitrogen-containing heterocyclic compounds include N-methyl-2-pyrrolidone, N-ethyl-2-pyrrolidone, N-vinyl-2-pyrrolidone, 2-pyrrolidone, 5-methyl-2-pyrrolidone, and the like.

The composition for aqueous ink jet may contain one component or a plurality of components as the solvent other than water.

The content of the solvent other than water in the composition for aqueous ink jet is preferably 1% by mass or more and 40% by mass or less, more preferably 5% by mass or more and 35% by mass or less, and still more preferably 10% by mass or more and 30% by mass or less.

Thus, the effect by containing the solvent other than water is more remarkably exhibited.

Urea

The composition for aqueous ink jet may contain urea.

The urea functions as a moisturizer of the composition for aqueous ink jet and also functions as a dyeing auxiliary for improving the dyeing property of a dye when a dye is contained as the coloring material.

Examples of the urea include urea, ethylene urea, tetramethyl urea, thiourea, 1,3-dimethyl-2-imidazolidinone, and the like.

The content of the urea in the composition for aqueous ink jet is preferably 0.5% by mass or more and 15% by mass or less, more preferably 1.0% by mass or more and 12% by mass or less, and still more preferably 2.0% by mass or more and 10% by mass or less.

Thus, the contents of the components such as the coloring material etc. other than the urea can be prevented from being decreased, and the effect by containing the urea as described above can be more remarkably exhibited while satisfactorily exhibiting the functions.

Surfactant

The composition for aqueous ink jet may contain a surfactant.

Thus, the wettability of the composition for aqueous ink jet to a recording medium (substrate) can be more improved, thereby causing an advantage for producing better image quality.

Usable examples of the surfactant contained in the composition for aqueous ink jet include various surfactants such as an anionic surfactant, a cationic surfactant, a nonionic surfactant, and the like.

More specific examples of the surfactant contained in the composition for aqueous ink jet include an acetylene-based surfactant, a silicone-based surfactant, a fluorine-based surfactant, and the like.

The content of the surfactant in the composition for aqueous ink jet is preferably 0.2% by mass or more and 4.0% by mass or less, more preferably 0.3% by mass or more and 3.5% by mass or less, and still more preferably 0.5% by mass or more and 3.0% by mass or less.

Thus, the contents of the components such as the coloring material etc. other than the surfactant can be prevented from being decreased, and the effect by containing the surfactant as described above can be more remarkably exhibited while satisfactorily exhibiting the function.

Other Components

The composition for aqueous ink jet may contain a component (other component) other than the components described above.

Examples of the other component include pH adjusters such as tripropanolamine (TPA), triethanolamine (TEA), N,N-bis(2-hydroxyethyl)-2-aminoethanesuofonic acid (BES), 3-[4-(2-hydroxyethyl)-1-piperazinyl]propanesulfonic acid (EPPS), 2-morpholinoethanesulfonic acid (MES), piperazine-N,N'-bis(2-hydroxypropanesulfonic acid) (POPSO), and the like; chelating agents such as ethylenediaminetetraacetic acid salts (EDTA) and the like; antiseptic agents/antifungal agents such as sodium benzoate, pentachlorophenol sodium, 2-pyridinethiol-1-oxide sodium, sodium sorbate, sodium dehydroacetate, 1,2-dibenzoisothiazolin-3-one, 4-chloro-3-methylphenol, and the like; anti-rusting agents such as benzotriazole and the like; an antioxidant; an ultraviolet absorber; an oxygen absorber; a dissolving aid; and the like.

The content (total content when a plurality of components are contained as the other component) of the other component is preferably 5% by mass or less and more preferably 3% by mass or less.

The viscosity at 25° C. of the composition for aqueous ink jet is preferably 2 mPa·s or more and 30 mPa·s or less, more preferably 3 mPa·s or more and 20 mPa·s or less, and still more preferably 4 mPa·s or more and 10 mPa·s or less.

Thus, the ejection stability of the composition for aqueous ink jet is more improved.

The viscosity can be determined by measurement using a vibrating viscometer according to JIS 28809.

The composition for aqueous ink jet of the present invention can be applied to, for example, ink jet printing (for example, direct printing) and the like.

The composition for aqueous ink jet of the present invention is generally applied to a recording apparatus using an ink jet method in a state of being housed in a vessel such as a cartridge, a bag, a tank, or the like. In other words, a recording apparatus according to the present invention is provided with a vessel (ink cartridge or the like) which houses the composition for aqueous ink jet of the present invention.

Recording Medium

Examples of a recording medium to which the composition for aqueous ink jet of the present invention is applied include, but are not particularly limited to, fabrics (hydrophobic fiber fabrics and the like), resin (plastic) films, paper, glass, metals, porcelains, and the like. Also, besides a sheet shape, a material having a three-dimensional shape, for example, a spherical shape, a rectangular parallelepiped shape, or the like, may be used as the recording medium.

When the recording medium is a fabric, examples of the fibers constituting the fabric include polyester fibers, nylon fibers, triacetate fibers, diacetate fibers, polyamide fibers, a blend of two or more types of these fibers, and the like. There may also be used a blend of these fibers with regenerated fibers of rayon or the like or with natural fibers of cotton, silk, wool, or the like.

When the recording medium is a resin (plastic) film, examples of the resin (plastic) film include a polyester film, a polyurethane film, a polycarbonate film, a polyphenylene sulfide film, a polyimide film, a polyamide-imide film, and the like.

The resin (plastic) film may be a laminate formed by laminating a plurality of layers or may be composed of a graded material whose composition is changed in a graded manner.

Method for Producing Recorded Product (Recording Method)

Next, described is a method for producing a recorded product (recording method) using the composition for aqueous ink jet of the present invention described above.

The composition for aqueous ink jet of the present invention may be used by any method as long as it is subjected to ejection by an ink jet method, and can be used, for example, for producing a recorded product by a method described below.

First Embodiment

A method for producing a recorded product (recording method) according to a first embodiment includes an ejection step of ejecting the composition for aqueous ink jet to a recording medium composed of a fiber-containing material by an ink jet method, and a precipitation step of precipitating calcium oxalate in the recording medium.

In the configuration, the gaps of fibers are filled with the calcium oxalate precipitated in the recording medium, and thus excessive permeation of the coloring material (entering of the coloring material) into the recording medium can be effectively prevented, thereby enabling to achieve excellent color development of a recorded product.

In particular, in the present embodiment, the recording medium is treated in advance with a precipitation accelerator containing oxalate ions or calcium ions at a higher content than that in the composition for aqueous ink jet (the composition for aqueous in jet of the present invention which is ejected to the recording medium). In other words, the method for producing a recorded product of the present embodiment includes a precipitation accelerator adding step of adding the precipitation accelerator, containing oxalate ions or calcium ions at a higher content than that in the composition for aqueous ink jet, to the recording medium composed of a fiber-containing material, and an ejection step of ejecting the composition for aqueous ink jet of the present invention to the recording medium.

In the configuration, calcium oxalate is precipitated in the recording medium (precipitation step) when the composition for aqueous ink jet ejected in the ejection step comes in contact with the recording medium. Thus, the composition for aqueous ink jet added to the recording medium can be effectively prevented from unintendedly permeating into the substrate, and thus the color development of the recorded product can be made more excellent.

In the present embodiment, the recording medium may be composed of a fiber-containing material and is preferably a fabric.

Among various recording media composed a fiber-containing material, particularly, a fabric has the problem of high liquid permeability and thus has difficulty in enhancing the color development of the recorded product. However, even when the recording medium is a fabric, the method for producing a recorded product of the present invention can more effectively achieve excellent color development of the recorded product. That is, when the recording medium is a fabric, the effect of the method for producing a recorded product of the present invention is more remarkably exhibited.

Precipitation Accelerator Adding Step

In the present embodiment, in advance before the composition for aqueous ink jet of the present invention is ejected to the recording medium, the recording medium is treated with the precipitation accelerator containing oxalate ions or calcium ions at a higher content than that in the composition for aqueous ink jet.

The precipitation accelerator may be in any form but is preferably liquid.

Thus, the precipitation accelerator can be more easily added to the recording medium. Also, unintended variation can be more effectively prevented from occurring in the amounts of precipitation accelerator added to portions of the recording medium to which the precipitation accelerator is to be added.

When the precipitation accelerator used in the precipitation accelerator adding step contains oxalate ions at a higher content than the oxalate ion content in the composition for aqueous ink jet, the oxalate ion content in the precipitation accelerator is preferably 2.0 ppm or more and 35 ppm or less, more preferably 3.0 ppm or more and 30 ppm or less, and still more preferably 4.0 ppm or more and 27 ppm or less.

Therefore, it is possible to more effectively precipitate calcium oxalate in the recording medium while more effectively preventing the unintended precipitation of calcium oxalate during storage of the precipitation accelerator and preventing the occurrence of unintended disturbance in an image formed by the composition for aqueous ink jet, thereby more remarkably exhibiting the effect by using the precipitation accelerator described above.

When the precipitation accelerator used in the precipitation accelerator adding step contains calcium ions at a higher content than the calcium ion content in the composition for aqueous ink jet, the calcium ion content in the precipitation accelerator is preferably 2.0 ppm or more and 10 ppm or less, more preferably 3.0 ppm or more and 9.0 ppm or less, and still more preferably 3.5 ppm or more and 8.0 ppm or less.

Therefore, it is possible to more effectively precipitate calcium oxalate in the recording medium while more effectively preventing the unintended precipitation of calcium oxalate during storage of the precipitation accelerator and preventing the occurrence of unintended disturbance in an image formed by the composition for aqueous ink jet, thereby more remarkably exhibiting the effect by using the precipitation accelerator described above.

When the precipitation accelerator is an aqueous solution containing at least one of oxalate ions and calcium ions, the content of water ($H_2O$) in the precipitation accelerator is preferably 60% by mass or more, more preferably 70% by mass or more and 99.99% by mass or less, and still more preferably 75% by mass or more and 99.98% by mass or less.

Thus, the viscosity of the precipitation accelerator can be more securely adjusted to a preferred value, and, for example, ejection stability by an ink jet method can be more improved. In addition, even when the water contained in the precipitation accelerator is partially vaporized, calcium oxalate can be more effectively precipitated in the recording medium while effectively preventing the unintended precipitation of calcium oxalate in the precipitation accelerator.

The precipitation accelerator may be added by any method, and examples thereof include an immersion method of immersing the recording medium in the precipitation accelerator, a method of adding the precipitation accelerator to the recording medium by an ink jet method, a method of adding the precipitation accelerator by a printing method other than the ink jet method, and the like.

When the precipitation accelerator is added to the recording medium by the ink jet method, the precipitation accelerator also preferably satisfies the condition of formula (1) described above.

When the content of oxalate ions contained in the recording medium at the end of the precipitation accelerator adding step (immediately before the ejection step) is higher than the oxalate ion content in the composition for aqueous ink jet to be applied in the ejection step, the oxalate ion content in the recording medium at the end of the precipitation accelerator adding step (immediately before the ejection step) is preferably higher than the oxalate ion content in the composition for aqueous ink jet to be ejected in the ejection step, and, specifically is preferably 1% by mass or more and 10% by mass or less, more preferably 1.5% by mass or more and 9% by mass or less, and still more preferably 2% by mass or more and 8% by mass or less.

Thus, calcium oxalate can be more effectively precipitated in the recording medium while more effectively preventing the occurrence of unintended disturbance in an image formed by the composition for aqueous ink jet, thereby more remarkably exhibiting the effect by using the precipitation accelerator described above.

When the content of calcium ions contained in the recording medium at the end of the precipitation accelerator adding step (immediately before the ejection step) is higher than the calcium ion content in the composition for aqueous ink jet to be applied in the ejection step, the calcium ion content in the recording medium at the end of the precipitation accelerator adding step (immediately before the ejection step) is preferably higher than the calcium ion content in the composition for aqueous ink jet to be ejected in the ejection step, and, specifically is preferably 1% by mass or more and 5% by mass or less, more preferably 1.5% by mass or more and 4.5% by mass or less, and still more preferably 2% by mass or more and 4% by mass or less.

Thus, calcium oxalate can be more effectively precipitated in the recording medium while more effectively preventing the occurrence of unintended disturbance in an image formed by the composition for aqueous ink jet, thereby more remarkably exhibiting the effect by using the precipitation accelerator described above.

When the precipitation accelerator is selectively added only to a portion of the recording medium, the content in the portion preferably satisfies the condition described above.

Pretreatment Step

The recording medium may be pretreated (pretreatment other than the precipitation accelerator adding step) in advance before the composition for aqueous ink jet of the present invention is adhered to the recording medium (before the ejection step).

The pretreatment can use, for example, a known pretreatment agent, and the pretreatment agent generally contains a sizing agent, a pH adjuster, and a hydrotropic agent.

Preferred usable examples of the sizing agent include natural gums such as guar, locust bean, and the like; starches; sodium alginate; seaweeds such as Funori and the like; plant skin materials such as pectic acid and the like; cellulose derivatives such as methyl cellulose, ethyl cellulose, hydroxyethyl cellulose, carboxymethyl cellulose, and the like; processed starches such as roasted starch, alpha-starch, carboxymethyl starch, carboxyethyl starch, hydroxyethyl starch, and the like; processed natural gums such as shiratsu gum, roast bean gum, and the like; synthetic pastes such as algin derivatives, polyvinyl alcohol, polyacrylic acid esters, and the like; an emulsion; and the like.

Preferred usable examples of the pH adjuster include acid ammonium salts such as ammonium sulfate, ammonium tartrate, and the like; and the like.

Usable examples of the hydrotropic agent include various ureas such as urea, alkylureas such as dimethylurea, thiourea, monomethylthiourea, dimethylthiourea, and the like, and the like.

The pretreatment agent may further contain, for example, silica.

Also, when the pretreatment is performed by the pretreatment agent, the pretreatment may be performed before the ejection step, and for example, may be performed before the precipitation accelerator adding step described above or after the precipitation accelerator adding step. In addition, a composition having the function as the precipitation accelerator may be used as the pretreatment agent in the pretreatment step. That is, the precipitation accelerator adding step and the pretreatment step may be performed as the same step.

Ejection Step

In the ejection step, the composition for aqueous ink jet of the present invention is ejected as droplets to the recording medium (the recording medium to which the precipitation accelerator has been added) by an ink jet method. This step may use a plurality of types of compositions for aqueous ink jet (for example, a plurality of types of compositions for aqueous ink jet having different compositions).

The ink jet method of ejecting the composition for aqueous ink jet may be of any type, and examples thereof include a charge deflection type, a continuous type, an on-demand type (a piezo type, a bubble jet (registered trademark) type, and the like), and the like. Among these, the piezo type is preferred from the viewpoint of high definition, miniaturization of an apparatus, etc.

Precipitation Step

The composition for aqueous ink jet ejected in the ejection step is adhered to the recording medium, thereby forming a specific image (pattern).

When the composition for aqueous ink jet is adhered to the recording medium, an image is formed on the recording medium, and at the same time, calcium oxalate is precipitated by the precipitation accelerator previously added to the recording medium. Thus, the gaps of fibers are filled with calcium oxalate precipitated in the recording medium, and thus excessive permeation of the coloring material (entering of the coloring material) into the recording medium can be effectively prevented, thereby enabling to achieve excellent color development of the recorded product.

In this step, after the composition for aqueous ink jet is ejected, water may be evaporated from the ejected composition for aqueous ink jet by allowing to stand for a predetermined time, thereby precipitating calcium oxalate. However, precipitation of calcium oxalate may be accelerated by heating the atmosphere and the recording medium, bringing the atmosphere of the recording medium into a low-humidity state (for example, a dehumidized state of 30% RH or less), or placing the recording medium in a reduced-pressure environment.

Thus, not only the precipitation of calcium oxalate can be accelerated to cause the more excellent productivity of the recorded product, but also, for example, the effect by precipitation of calcium oxalate as described above can be more remarkably exhibited. In addition, the calcium oxalate precipitated by accelerating precipitation as described above is prevented from becoming coarse crystals and thus easily becomes microcrystals. Therefore, removal in the subsequent washing step is facilitated, and thus the calcium oxalate can be effectively prevented from unintendedly remaining in the final recorded product.

When this step is performed under a heating condition, the heating temperature is preferably 40° C. or more and 100° C. or less, more preferably 45° C. or more and 98° C. or less, and still more preferably 50° C. or more and 85° C. or less.

Thus, the precipitation of calcium oxalate can be effectively accelerated while effectively preventing the occurrence of bumping during removal of water. In addition, the particle size of calcium oxalate precipitated in the recording medium can be more decreased.

Fixing Step

In the fixing step, the image (pattern) formed by the composition for aqueous ink jet applied in the ejection step is fixed to the recording medium.

The fixing step is generally performed under a high-temperature humidified condition.

The treatment temperature in the fixing step is, for example, preferably 90° C. or more and 150° C. or less, more preferably 95° C. or more and 130° C. or less, and still more preferably 98° C. or more and 120° C. or less.

The treatment time in the fixing step is not particularly limited, but is preferably 5 minutes or more and 120 minutes or less, more preferably 10 minutes or more and 90 minutes or less, and still more preferably 15 minutes or more and 60 minutes or less.

The high-temperature humidifying treatment in the fixing step can use any one of various steamers (for example, steamer type "DHe" manufactured by Mathis AG).

Washing Step

The washing step is performed for the recording medium (recorded product) on which the image formed by the composition for aqueous ink jet has been fixed.

The washing step can be performed by, for example, rubbing/washing the recording medium, on which the image has been fixed, with tap water, and then immersing the recording medium under proper stirring in a washing solution prepared by adding a nonionic soaping agent to hot water of 40° C. or more and 70° C. or less. The immersion time in the washing solution can be set to, for example, 5 minutes or more and 60 minutes or less. Then, the washing agent is removed by hand-rubbing/washing while adding tap water to the solution.

The washing step can remove the calcium oxalate precipitated in the precipitation step and can effectively prevent the calcium oxalate from unintendedly remaining in the finally obtained recorded product.

Second Embodiment

Next, a method for producing a recorded product (recording method) according to a first embodiment is described, but differences from the embodiment described above are mainly described with the description of same matters being omitted.

The production method of the present embodiment includes an ejection step of ejecting a composition for aqueous ink jet to a recording medium, and a precipitation accelerator adding step of adding a precipitation accelerator to the recording medium to which the composition for aqueous ink jet has been added, and thus calcium oxalate is precipitated (precipitation step) in the recording medium by the precipitation accelerator added in the precipitation accelerator adding step. That is, although in the embodiment described above, the precipitation accelerator is added to the recording medium in advance (as pretreatment) before the composition for aqueous ink jet of the present invention is added to the recording medium, in the present embodiment, the precipitation accelerator is added after (as posttreatment) the composition for aqueous ink jet of the present invention is added to the recording medium. In other words, in the present embodiment, the precipitation step is performed by adding the precipitation accelerator, which contains oxalate ions or calcium ions at a higher content than that in the composition for aqueous ink jet, to the recording medium to which the composition for aqueous ink jet has been added.

Thus, the precipitation accelerator may be added after the composition for aqueous ink jet is added to the recording medium. This configuration can also achieve the same effect as described above.

Like in the first embodiment, in the present embodiment, pretreatment may be performed in advance before the ejection step and the fixing step and the washing step may be performed after the ejection step. Also, in the present embodiment, in precipitating the calcium oxalate (precipitation step), the calcium oxalate may be precipitated by evaporating water from the added precipitation accelerator by allowing to stand for a predetermine time after the precipitation accelerator is added. For example, precipitation of the calcium oxalate may be accelerated by heating an atmosphere or the recording medium, by bringing the atmosphere of the recording medium in a low-humidity state (for example, a dehumidified state of 30% RH or less), or by placing the recording medium in a reduced-pressure environment.

The preferred embodiments of the present invention are described above, but the present invention is not limited to these embodiments.

EXAMPLES

Next, examples of the present invention are described.

[1] Preparation of Composition for Aqueous Ink Jet

Example 1

First, commercial C.I. Acid Orange 33 was purified by activated carbon filtration, microfiltration, and ultrafiltration.

Then, the purified C.I. Acid Orange 33 was mixed at a predetermined ratio with glycerin (Gly), diethylene glycol (DEG), triethylene glycol (TEG), triethylene glycol monobutyl ether (TEGmBE), 2-pyrrolidone (2-Py), Olfine E1010 (manufactured by Nissin Chemical Industry Co., Ltd.), triethanolamine serving as a pH adjuster, urea, benzotriazole serving as an anti-rusting agent, ethylenediamine tetraacetic acid salt (EDTA) serving as a chelating agent, PROXEL-XL2(S) (manufactured by Lonza Japan Ltd.) serving as an antifungal agent (antiseptic agent), and pure water, thereby preparing a composition for aqueous ink jet having a composition shown in Table 1, in which the coloring material was dissolved.

Examples 2 to 6

Compositions for aqueous ink jet were produced by the same method as in Example 1 except that the purification conditions for C.I. Acid Orange 33 and the types and ratios of the components mixed with C.I. Acid Orange 33 were changed to provide compositions shown in Table 1.

Example 7

First, commercial C.I. Acid Blue 87 was purified by activated carbon filtration, microfiltration, and ultrafiltration.

Then, the purified C.I. Acid Blue 87 was mixed at a predetermined ratio with glycerin (Gly), diethylene glycol (DEG), triethylene glycol (TEG), triethylene glycol monobutyl ether (TEGmBE), 2-pyrrolidone (2-Py), Olfine E1010 (manufactured by Nissin Chemical Industry Co., Ltd.), triethanolamine serving as a pH adjuster, urea, benzotriazole serving as an anti-rusting agent, ethylenediamine tetraacetic acid salt (EDTA) serving as a chelating agent, PROXEL-XL2(S) (manufactured by Lonza Japan Ltd.) serving as an antifungal agent (antiseptic agent), and pure water, thereby preparing a composition for aqueous ink jet having a composition shown in Table 1, in which the coloring material was dissolved.

Example 8

First, commercial C.I. Acid Black 52:1 was prepared. The dye was purified by activated carbon filtration, microfiltration, and ultrafiltration.

Then, the purified C.I. Acid Black 52:1 was mixed at a predetermined ratio with glycerin (Gly), diethylene glycol (DEG), triethylene glycol (TEG), triethylene glycol monobutyl ether (TEGmBE), 2-pyrrolidone (2-Py), Olfine E1010 (manufactured by Nissin Chemical Industry Co., Ltd.), triethanolamine serving as a pH adjuster, urea, benzotriazole serving as an anti-rusting agent, ethylenediamine tetraacetic acid salt (EDTA) serving as a chelating agent, PROXEL-XL2(S) (manufactured by Lonza Japan Ltd.) serving as an antifungal agent (antiseptic agent), and pure water, thereby preparing a composition for aqueous ink jet having a composition shown in Table 1, in which the coloring material was dissolved.

Comparative Example 1

A composition for aqueous ink jet was produced by the same method as in Example 1 except that commercial C.I. Acid Orange 33 was directly used without being purified, and ion exchange water was used in place of pure water.

Comparative Examples 2 to 7

Compositions for aqueous ink jet were produced by the same method as in Example 1 except that the purification conditions for C.I. Acid Orange 33 were changed to provide compositions shown in Table 1.

The composition etc. of the composition for aqueous ink jet of each of the examples and each of the comparative examples are shown in Table 1. In the table, C.I. Acid Orange 33 is denoted by "AO33", C.I. Acid Blue 87 by "AB87", C.I. Acid Black 52:1 by "AB52:1", glycerin by "Gly", diethylene glycol by "DEG", triethylene glycol by "TEG", triethylene glycol monobutyl ether by "TEGmBE", 2-pyrrolidone by "2-Py", Olfine E1010 (manufactured by Nissin Chemical Industry Co., Ltd.) by "E1010", Olfine STG (manufactured by Nissin Chemical Industry Co., Ltd.) by "STG", Olfine PD002W (manufactured by Nissin Chemical Industry Co., Ltd.) by "PD200W", triethanolamine by "TEA", benzotriazole by "BTA", ethylenediamine tetraacetic acid salt by "EDTA", and PROXEL-XL2 (S) (manufactured by Lonza Japan Ltd.) by "XL2". The calcium ion content and oxalate ion content shown in Table 1 are values determined by an ion chromatography method. ASupp4 (manufactured by Metrohm AG) was used as a column for quantitatively determining the calcium ion content, and ASupp4 (manufactured by Metrohm AG) was used as a column for quantitatively determining the oxalate ion content. The viscosity at 25° C. of the composition for aqueous ink jet of any one of the examples was a value within a range of 4 mPa·s or more and 10 mPa·s or less. The viscosity of the composition for aqueous ink jet was determined by measurement using a vibrating viscometer (VM-100 manufactured by Senikoc Corporation) according to JIS Z8809.

TABLE 1

| | | Example | | | | | | | |
|---|---|---|---|---|---|---|---|---|---|
| | | 1 | 2 | 3 | 4 | 5 | 6 | 7 | 8 |
| Content [parts by mass] | AO33 | 10.0 | 10.0 | 10.0 | 10.0 | 10.0 | 10.0 | — | — |
| | AB87 | — | — | — | — | — | — | 10.0 | — |
| | AB52:1 | — | — | — | — | — | — | — | 10.0 |
| | Gly | 3.0 | 3.0 | 3.0 | 3.0 | 3.0 | 3.0 | 3.0 | 3.0 |
| | DEG | 1.0 | 1.0 | 1.0 | 1.0 | 1.0 | 1.0 | 1.0 | 1.0 |
| | TEG | 1.0 | 1.0 | 1.0 | 1.0 | 1.0 | 1.0 | 1.0 | 1.0 |
| | TEGmBE | 2.0 | 2.0 | 2.0 | 2.0 | 2.0 | 2.0 | 2.0 | 2.0 |
| | 2-Py | 10.0 | 10.0 | 10.0 | 10.0 | 10.0 | 10.0 | 10.0 | 10.0 |
| | E1010 | 1.0 | 1.0 | 1.0 | 1.0 | 1.0 | 1.0 | 1.0 | 1.0 |
| | TEA | 1.0 | 1.0 | 1.0 | 1.0 | 1.0 | 1.0 | 1.0 | 1.0 |
| | Urea | 5.0 | 5.0 | 5.0 | 5.0 | 5.0 | 5.0 | 5.0 | 5.0 |
| | BTA | 0.01 | 0.01 | 0.01 | 0.01 | 0.01 | 0.01 | 0.01 | 0.01 |
| | EDTA | 0.02 | 0.02 | 0.02 | 0.02 | 0.02 | 0.02 | 0.02 | 0.02 |
| | XL2 | 0.2 | 0.2 | 0.2 | 0.2 | 0.2 | 0.2 | 0.2 | 0.2 |
| | Water | 65.77 | 65.77 | 65.77 | 65.77 | 65.77 | 65.77 | 65.77 | 65.77 |
| | Total | 100 | 100 | 100 | 100 | 100 | 100 | 100 | 100 |
| Calcium ion content x (ppm) | | 4.0 | 5.0 | 5.0 | 11 | 8.0 | 2.0 | 4.0 | 4.0 |
| Oxalate ion content y (ppm) | | 15 | 12 | 8.0 | 1.0 | 3.0 | 25 | 15 | 15 |
| Condition of formula (1) | | ○ | ○ | ○ | ○ | ○ | ○ | ○ | ○ |

| | | Comparative Example | | | | | | |
|---|---|---|---|---|---|---|---|---|
| | | 1 | 2 | 3 | 4 | 5 | 6 | 7 |
| Content [parts by mass] | AO33 | 10.0 | 10.0 | 10.0 | 10.0 | 10.0 | 10.0 | 10.0 |
| | AB87 | — | — | — | — | — | — | — |
| | AB52:1 | — | — | — | — | — | — | — |
| | Gly | 3.0 | 3.0 | 3.0 | 3.0 | 3.0 | 3.0 | 3.0 |
| | DEG | 1.0 | 1.0 | 1.0 | 1.0 | 1.0 | 1.0 | 1.0 |
| | TEG | 1.0 | 1.0 | 1.0 | 1.0 | 1.0 | 1.0 | 1.0 |
| | TEGmBE | 2.0 | 2.0 | 2.0 | 2.0 | 2.0 | 2.0 | 2.0 |
| | 2-Py | 10.0 | 10.0 | 10.0 | 10.0 | 10.0 | 10.0 | 10.0 |
| | E1010 | 1.0 | 1.0 | 1.0 | 1.0 | 1.0 | 1.0 | 1.0 |
| | TEA | 1.0 | 1.0 | 1.0 | 1.0 | 1.0 | 1.0 | 1.0 |
| | Urea | 5.0 | 5.0 | 5.0 | 5.0 | 5.0 | 5.0 | 5.0 |
| | BTA | 0.01 | 0.01 | 0.01 | 0.01 | 0.01 | 0.01 | 0.01 |
| | EDTA | 0.02 | 0.02 | 0.02 | 0.02 | 0.02 | 0.02 | 0.02 |
| | XL2 | 0.2 | 0.2 | 0.2 | 0.2 | 0.2 | 0.2 | 0.2 |
| | Water | 65.77 | 65.77 | 65.77 | 65.77 | 65.77 | 65.77 | 65.77 |

TABLE 1-continued

| | | | | | | | |
|---|---|---|---|---|---|---|---|
| Total | 100 | 100 | 100 | 100 | 100 | 100 | 100 |
| Calcium ion content x (ppm) | 51 | 12 | 20 | 10 | 10 | 10 | 5.0 |
| Oxalate ion content y (ppm) | 172 | 8.0 | 3.0 | 19 | 12 | 8.0 | 27 |
| Condition of formula (1) | x | x | x | x | x | x | x |

[2] Evaluation

[2-1] Occurrence State of Foreign Material in Composition for Aqueous Ink Jet

The composition for aqueous ink jet of each of the examples and the comparative examples was allowed to stand in an environment of 60° C. for 24 hours. Then, the composition was cooled to −10° C. over 24 hours and further allowed to stand for 24 hours. Then, the composition for aqueous ink jet was allowed to stand at room temperature (25° C.) for 24 hours, and then 10 mL of the composition for aqueous ink jet was filtered by using a filter (Isopore manufactured by Merck Corporation) having a mesh size of 0.4 μm. Then, the number of foreign materials (solid) present on the filter was counted and evaluated according to the following criteria.

A: No foreign material is observed.
B: The number of foreign materials is 1 or more and less than 5.
C: The number of foreign materials is 5 or more and less than 10.
D: The number of foreign materials is 10 or more and less than 20.
E: The number of foreign materials is 20 or more.

These results are summarized in Table 2.

TABLE 2

| | Occurrence state of foreign material |
|---|---|
| Example 1 | A |
| Example 2 | A |
| Example 3 | A |
| Example 4 | B |
| Example 5 | B |
| Example 6 | A |
| Example 7 | A |
| Example 8 | A |
| Comparative Example 1 | E |
| Comparative Example 2 | D |
| Comparative Example 3 | E |
| Comparative Example 4 | E |
| Comparative Example 5 | D |
| Comparative Example 6 | D |
| Comparative Example 7 | E |

Table 2 indicates that the present invention produces excellent results. These results suggest that the composition for aqueous ink jet of the present invention has excellent ejection stability and storage stability and is capable of stable droplet ejection by an ink jet method over a long time. Whereas, the comparative examples could not produce satisfactory results.

Also, a recorded product was produced by using the composition for aqueous ink jet of each of the examples as described below.

That is, first a polyester-made fabric used as a recording medium was pre-treated with a pretreatment agent containing a sizing agent, a pH adjuster, and a hydrotropic agent (pretreatment step).

Next, a precipitation accelerator was added to the recording medium by an ink jet method (precipitation accelerator adding step). In this case, the added pattern of the precipitation accelerator was the same as the added pattern of the composition for aqueous ink jet ejected in the ejection step (an image formed by the composition for aqueous ink jet). In addition, the precipitation accelerator having a water ($H_2O$) content of 95% by mass or more and 99.98% by mass or less was used. The recorded product using the composition for aqueous ink jet of each of Examples 1 to 3 and 6 to 8 was produced by using the precipitation accelerator containing calcium ions at a content of 4.0 ppm or more and 8.0 ppm or less, and the recorded product using the composition for aqueous ink jet of each of Examples 4 and 5 was produced by using the precipitation accelerator containing oxalate ions at a content of 15 ppm or more and 27 ppm or less.

Next, water was removed by heating the recording medium to which the precipitation accelerator had been added. In producing the recorded product using the composition for aqueous ink jet of each of Examples 1 to 3 and 6 to 8, the calcium ion content in the recording medium after water removal was 1% by mass or more and 5% by mass or less. In addition, in producing the recorded product using the composition for aqueous ink jet of each of Examples 4 and 5, the oxalate ion content in the recording medium after water removal was 1% by mass or more and 10% by mass or less.

Then, the composition for aqueous ink jet was ejected by an ink jet method (ejection step). The ejection step was performed while heating the recording medium at 60° C. When the composition for aqueous ink jet ejected in the ejection step was brought into contact with the recording medium, the water contained in the composition for aqueous ink jet was rapidly evaporated, thereby precipitating calcium oxalate (precipitation step).

Next, an image formed by the composition for aqueous ink jet was fixed to the recording medium by heat treatment at 110° C. for 30 minutes using a steamer (for example, steamer type "DHe" manufactured by Mathis AG) (fixing step).

Next, the recording medium, to which the image had been fixed, was rubbed/washed with tap water, then immersed under proper stirring for 30 minutes in a washing solution, prepared by adding a nonionic soaping agent to hot water of 60° C., and then further hand-rubbed/washed while adding tap water to the washing solution to remove the washing agent (washing step).

Then, drying treatment was performed to produce an intended recorded product.

Also, a recorded product was prepared as a control by the same method as described above except that the precipitation accelerator was not used.

As a result, the recorded product produced by the method including precipitating calcium oxalate in the recording medium showed clearly excellent color development as compared with the recorded product produced by a method not including precipitating calcium oxalate in the recording medium.

The invention claimed is:

1. A composition for aqueous ink jet, comprising water and a coloring material,
   wherein the calcium ion content x (ppm) and the oxalate ion content y (ppm) in the composition for aqueous ink jet satisfy $y \leq 3491.8x^{-3.386}$ wherein the oxalate ion content y is in the range of 12 ppm to 30 ppm, and
   wherein the coloring material is at least one selected from the group consisting of C.I. Acid Orange 33 and C.I. Acid Blue 87.

2. The composition for aqueous ink jet according to claim 1, wherein the calcium ion content x is 1.0 ppm or more and 8.0 ppm or less.

3. A method for producing a recorded product comprising:
   an ejection step of ejecting, by an ink jet method, the composition for aqueous ink jet according to claim 1 to a recording medium composed of a fiber-containing material; and
   a precipitation step of precipitating calcium oxalate in the recording medium.

4. The method for producing a recorded product according to claim 3, wherein the recording medium is a fabric.

5. The method for producing a recorded product according to claim 3, further comprising:
   a precipitation accelerator adding step of adding, to the recording medium, a precipitation accelerator containing oxalate ions or calcium ions at a higher content than that in the composition for aqueous ink jet.

6. The composition for aqueous ink jet according to claim 1, wherein the oxalate ion content y is in the range of 15 ppm to 30 ppm.

7. The composition for aqueous ink jet according to claim 1, wherein the oxalate ion content y is in the range of 25 ppm to 30 ppm.

* * * * *